(12) United States Patent
Janeczko et al.

(10) Patent No.: US 6,481,310 B2
(45) Date of Patent: Nov. 19, 2002

(54) FINE INCREMENT TILT MECHANISM

(75) Inventors: William J Janeczko, Midland, MI (US); Thomas M Glowacki, Freeland, MI (US); David Michael Byers, Saginaw, MI (US); Albert C Huber, Montrose, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/824,545

(22) Filed: Apr. 2, 2001

(65) Prior Publication Data

US 2002/0020244 A1 Feb. 21, 2002

Related U.S. Application Data

(60) Provisional application No. 60/199,245, filed on Apr. 24, 2000.

(51) Int. Cl.$^7$ ................................................. B62D 1/18
(52) U.S. Cl. ........................................ 74/493; 280/775
(58) Field of Search ............................. 74/493; 280/775

(56) References Cited

U.S. PATENT DOCUMENTS

| 4,607,540 | A | * | 8/1986 | Kinoshita et al. ............. 74/493 |
| 5,027,674 | A | * | 7/1991 | Nolte et al. ................... 74/493 |
| 5,029,489 | A | * | 7/1991 | Burmeister et al. ........... 74/493 |
| 5,144,855 | A | * | 9/1992 | Yamaguchi et al. ........... 74/493 |
| 6,036,288 | A | * | 3/2000 | Olgren et al. ................ 280/775 |
| 6,279,414 | B1 | * | 8/2001 | Moon ..................... 280/775 X |

\* cited by examiner

*Primary Examiner*—David A. Bucci
*Assistant Examiner*—Colby Hansen
(74) *Attorney, Agent, or Firm*—Edmund P. Anderson (57) ABSTRACT

The fine increment tilt mechanism for a vehicle steering column includes a steering column support housing and a tilt housing pivotally connected to the support housing for pivotal movement about a tilt axis. A plurality of fixed teeth on the support housing are engaged by a plurality of pivoted shoe teeth on the tilt housing to fix the tilt housing relative to a tilt axis. A shoe release lever includes a wedge that is moved to a position in which the pivoted shoe teeth are held in engagement with the fixed teeth after the tilt housing is pivoted about the tilt axis to a selected position.

14 Claims, 6 Drawing Sheets

FINE INCREMENT TILT MECHANISM

The disclosure incorporates the fine increment tilt mechanism and methods disclosed in provisional patent application No. 60/199,245, filed Apr. 24, 2000, whose priority is claimed for this application.

TECHNICAL FIELD

The fine increment tilt mechanism for a vehicle with a steering wheel tilt adjustment includes a positive lock that holds a plurality of fixed shoe teeth in engagement with a plurality of teeth on a pivoted shoe rack after a tilt adjustment is made.

BACKGROUND OF THE INVENTION

Steering columns with tilt adjustments have been used on motor vehicles for many years. A variety of adjustment mechanisms have been used on the steering columns. Some of the tilt columns are infinitely adjustable. Other columns have stepped adjustments. Locks on infinitely adjustable columns tend to be relatively complex and expensive. Steering columns with stepped tilt arrangements have a small number of positions. With a small number of tilt positions, the steering wheel is often either a little too high or a little too low.

One steering column with stepped adjustments that is used on a number of vehicles has a total of seven different positions. The positions are obtained by pivotally mounting a shoe, on a tilt housing, with four grooves that receive a pin on a support housing. The shoe with four grooves can receive the pin, with a tilt housing in four different positions. Each of the four positions are some distance apart because the bar or pin and the one tooth that are loaded in a collision must have substantial thickness to withstand the maximum forces that are applied. To obtain three more positions, a second shoe is added with three grooves that are each between two of the four grooves in the first shoe. Either the first shoe or the second shoe receives the pin in any given position. This system requires a second shoe, a second shoe bias spring, and additional space and still has a total of only seven positions.

Air bags for protection of drivers are mounted on the steering column. Energy absorption systems are also employed on some steering columns. For air bags and energy absorption devices to work properly, tilt adjustments should not change during a collision. Increasing the strength in a steering column, to accommodate the employment of air bags and energy absorption devices, has-been accomplished by increasing the weight and size of component parts.

SUMMARY OF THE INVENTION

The fine increment tilt mechanism is employed with a vehicle steering column tilt assembly including a first housing and a second housing. A steering shaft bearing bore, that is coaxial with an upper steering shaft axis, is provided in one of the first and second housings. A pivotal connection pivotally connects the first housing to the second housing for pivotal movement about a tilt axis that is transverse to the upper steering shaft axis. A tilt lock shoe is fixed to the second housing. The tilt lock shoe has a plurality of fixed teeth on an arcuate tooth rack. A tilt lock pivoted shoe is pivotally attached to the first housing for pivotal movement about a pivoted shoe axis that is parallel to and spaced from the tilt axis. The tilt lock pivoted shoe has a plurality of pivoted shoe teeth that are engageable with the plurality of fixed teeth carried by the second housing. A shoe release lever is pivotally attached to the first housing for pivotal movement between a shoe locked position and a shoe unlocked position. The shoe release lever has an integral wedge with a first wedge surface that slides on an arm of the first housing and a second wedge surface that engages a cam lobe on the tilt lock pivoted shoe and cams the plurality of pivoted shoe teeth into engagement with the plurality of fixed teeth when in the shoe locked position. The shoe release lever frees the plurality of pivoted shoe teeth to move out of engagement with the plurality of fixed teeth when in the shoe unlocked position.

BRIEF DESCRIPTION OF TIE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 7:
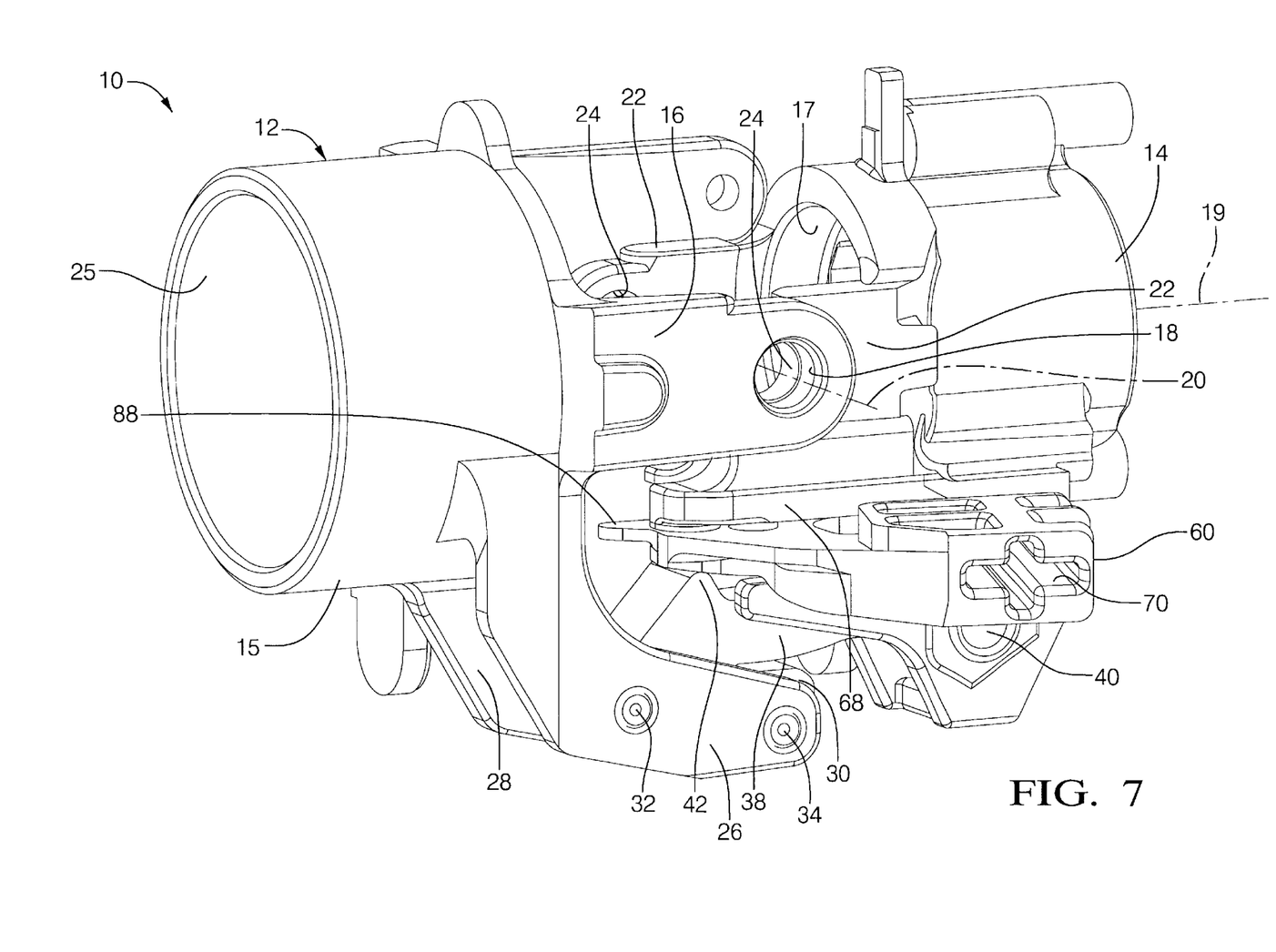
FIG. 7 is a perspective view of the steering column tilt assembly.
Figure 8:
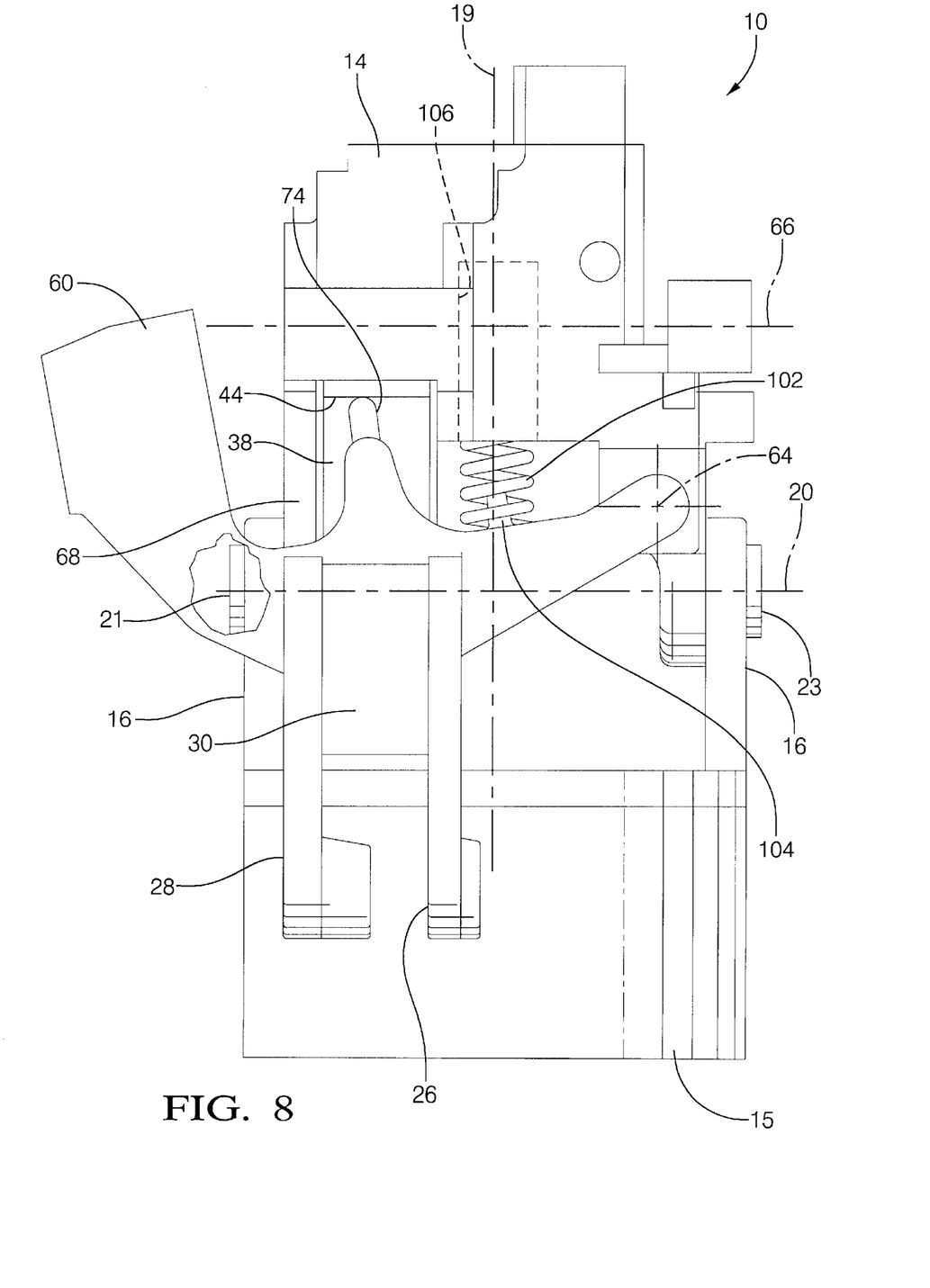
FIG. 8 is a bottom view of the steering column tilt assembly with parts broken away.

The steering column tilt assembly 10, as shown in FIG. 7, has a support assembly 12 and a steering column tilt housing 14. The support assembly 12 includes a steering column support housing 15 that is fixable to a steering column jacket assembly. The tilt housing 14 supports the upper end of the steering shaft assembly and a steering wheel. The steering shaft assembly includes an upper steering shaft supported by steering shaft bearings mounted in steering shaft bearing bores 17 in the tilt housing 14. The steering shaft bearing bores 17 are coaxial with an upper steering shaft axis 19.

The support housing 15 has two spaced apart parallel rearwardly extending ears 16 with pivot pin bores 18 having a common horizontal pivot pin bore axis 20. The tilt housing 14 has two forwardly extending ears 22 that are between the ears 16. Bores 24 through the ears 22 are coaxial with the pivot pin bores 18 and the pivot pin bore axis 20. A left side pivot pin 21 is pressed into the left side pivot pin bore 18 and the left side bore 24. A right pivot pin 23 is pressed into the right side pivot pin bore 18 and the right side bore 24. The pivot pin bore axis 20 is a tilt axis that passes through the axis 19 of rotation of the upper steering shaft; The steering column support housing 15, as shown in FIG. 7, has a steering column jacket bore 25. The jacket bore 25 telescopically receives the upper end of a column jacket and is fixed to the jacket. The jacket bore 25, as shown, receives a cylindrical tube. If the jacket is non-cylindrical, the jacket bore 25 will be modified as required.

A pair of spaced apart parallel arms 26 and 28 are integral with the support housing 15 and extend downwardly and rearwardly from the jacket bore 25. A steering wheel tilt lock fixed shoe 30 is secured between the parallel arms 26 and 28 by pins 32 and 34. The shoe 30 has a fixed tooth rack 31 with teeth 36 having tips that are in an arc about the pivot pin bore axis 20. The teeth 36 have a relatively small pitch to provide a fine increment tilt adjustment.

A steering wheel tilt lock pivoted shoe arm 38 is pivotally attached to the tilt housing 14 by a shoe pivot pin 40. The pivoted shoe arm 38 has a cam lobe 42 and a stop arm 44. A pivoted shoe rack 46 of teeth 48 is integral with the free end of the pivoted shoe arm 38. The teeth 48 pivot, with the pivoted shoe 38 about the pin 40, into and out of engagement with the fixed shoe 30 with teeth 36. The teeth 48 of the pivoted shoe rack 46 engage the teeth 36 on the fixed shoe 30 to hold the tilt housing 14 in a chosen position relative to support assembly 12 and the pivot pin bore axis 20.

Figures 4, 5:
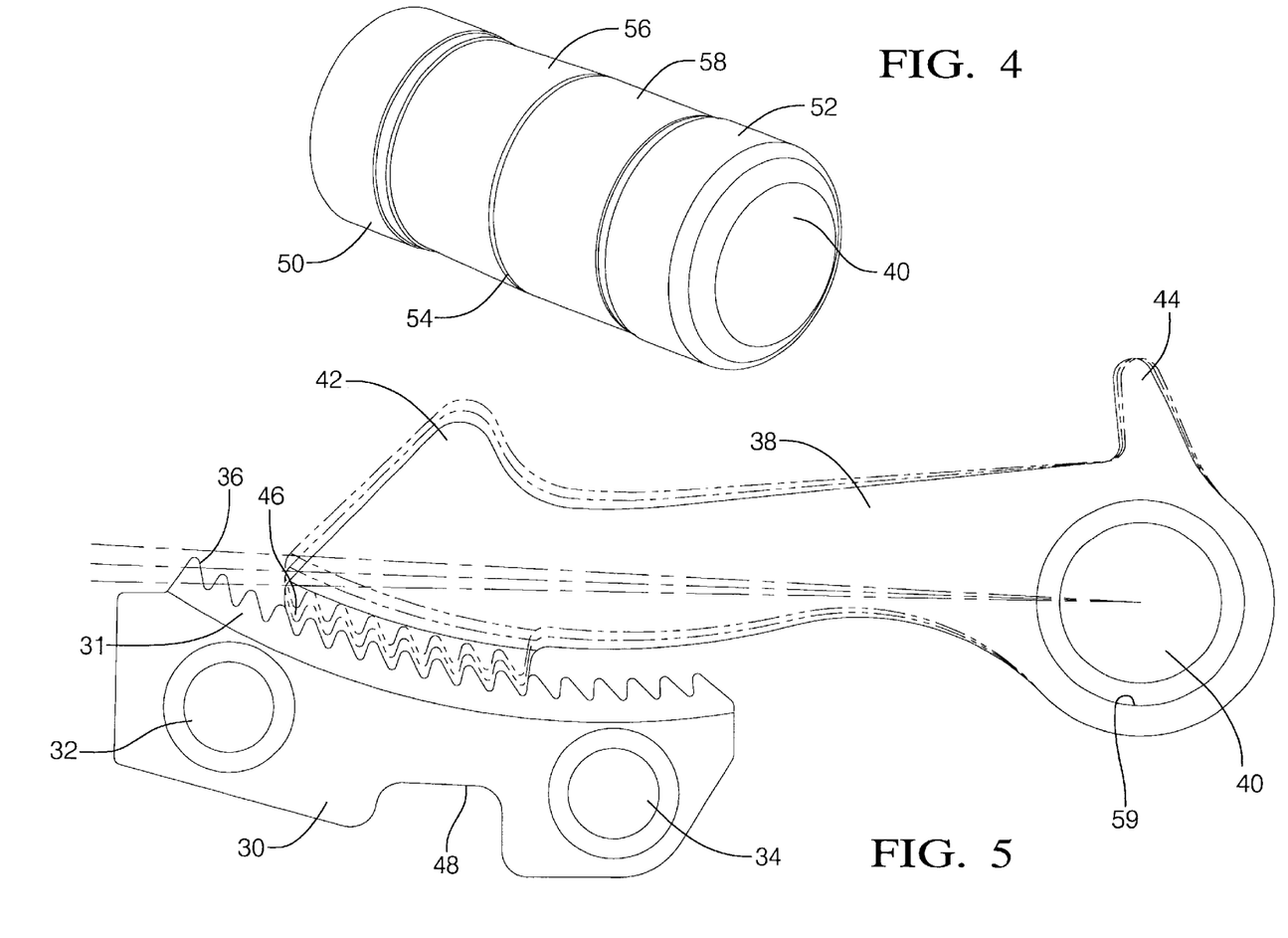
FIG. 4 is an enlarged perspective view of the shoe pivot pin.
FIG. 5 is an enlarged side elevational view of the tilt lock pivoted shoe arm and the tilt lock fixed shoe.

The shoe pivot pin 40 as shown in FIG. 4 has cylindrical end surfaces 50 and 52 and a center surface 54 with the same diameters. Angled surfaces 56 and 58 are frustoconical surfaces. These angled surfaces 56 and 58 have their maximum diameter where they join the center surface 54. The small diameter ends of the angled surfaces 56 and 58 are adjacent to the respective cylindrical end surfaces 50 and 52. The small angles of the angled surfaces 56 and 58 permit movement between the shoe pivot pin 40 and the pivot pin bore 59 to allow self alignment between the teeth 48 on the tilt lock pivoted shoe arm 38 and the teeth 36 on the fixed shoe 30.

A shoe release lever 60 is pivotally attached to the tilt housing 14 by an integral pin 62. The pin 62 permits pivotal movement of the shoe release lever 60 about an axis 64 that is perpendicular to the shoe pivot pin axis 66. The axis 64 is also spaced to the right side of the steering axis 19. The integral pin 62 also holds the shoe release lever 60 between the pivoted shoe 38 and an arm 68 of the tilt housing 14. An operating handle (not shown) is received in the passage 70 through the shoe release lever 60.

Figure 2:
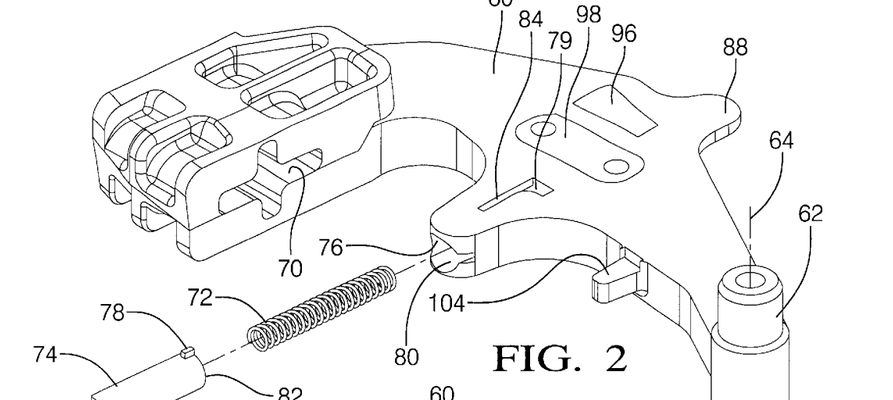
FIG. 2 is an expanded perspective view of the shoe release lever with the force pin and the force pin compression spring.
Figure 3:
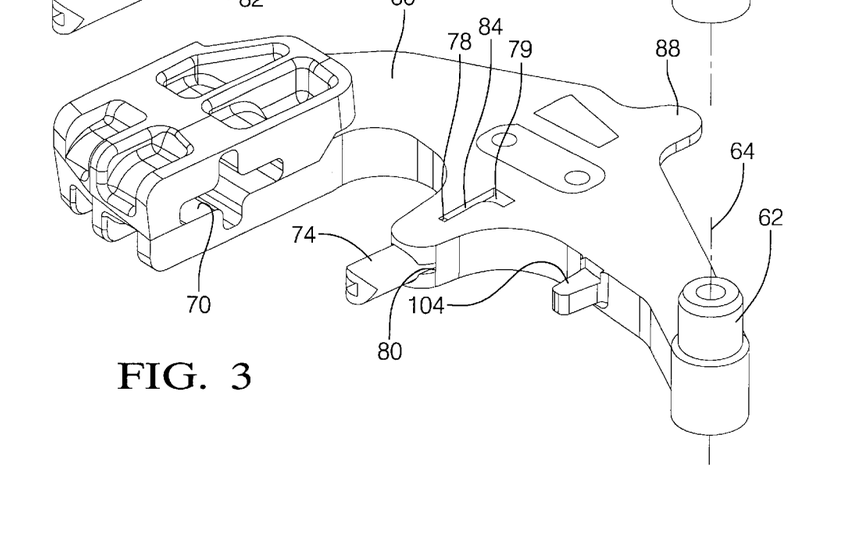
FIG. 3 is a perspective view of the shoe release lever with a force pin and force pin compression spring installed.
Figure 6A:
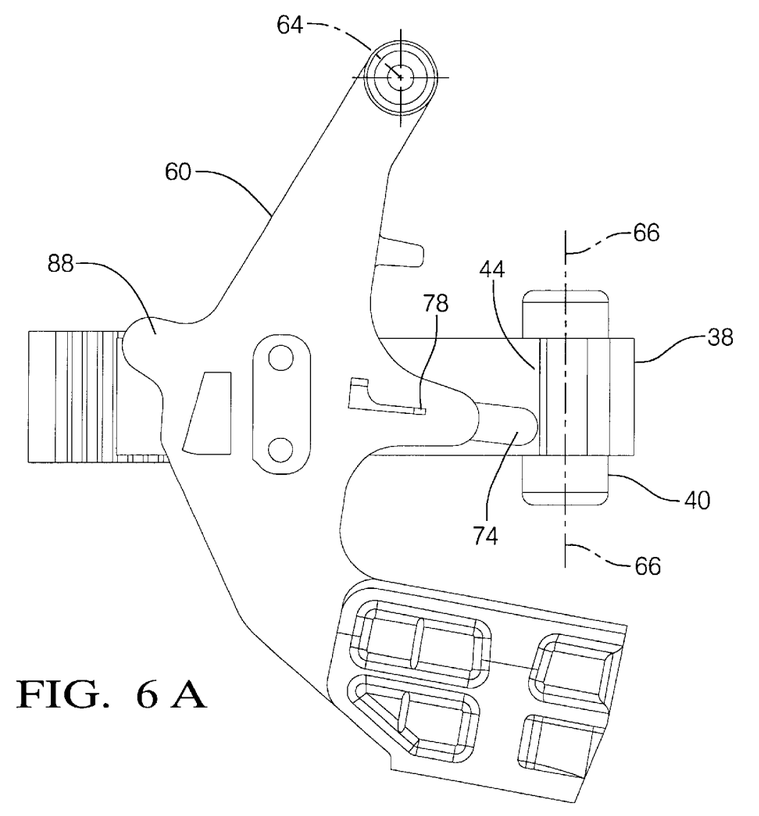
FIG. 6a is a plan view of the tilt lock pivoted shoe and shoe release lever in a locked position.

A compression spring 72 and a force pin 74 are received in a bore 76 in the shoe release lever 60 as shown in FIG. 2. A tab 78 on the force pin 74 is initially received in a groove 80 in the bore 76. After the base 82 of the force pin 74 reaches the bottom of the bore 76, the tab 78 is rotated 90° in a radial slot 79 and into an axial slot 84 with closed ends. The axial slot 84 permits the tab 78 and the force pin 74 to move axially and locks the force pin in the bore 76. The force pin 74 contacts the stop arm 44 on the tilt lock pivoted shoe 38, urges the teeth 48 away from the fixed shoe 30 with the teeth 36, and urges the shoe release lever 60 in a clockwise direction about the pin 62 as shown in FIGS. 6*a* and *c*.

Figure 6B:
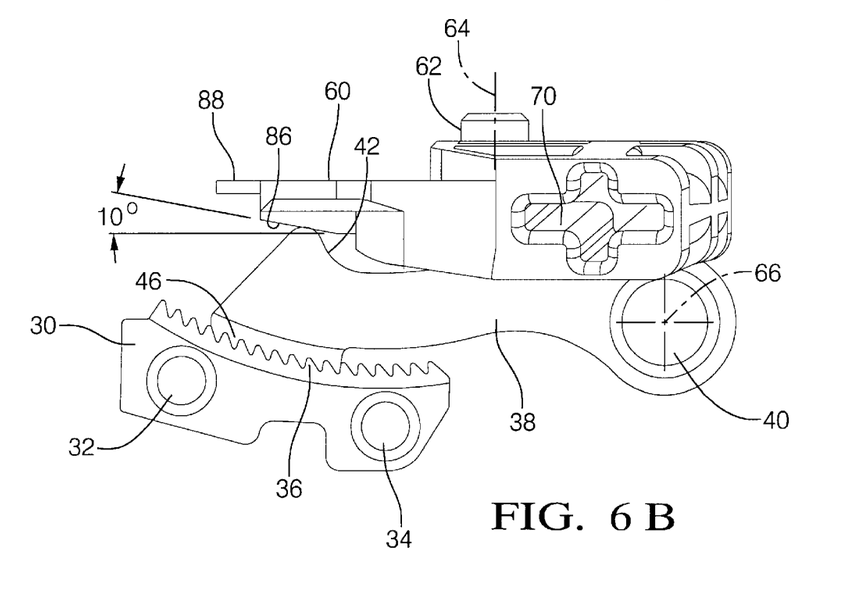
FIG. 6b is a side elevational view of the tilt lock pivoted shoe, the tilt lock fixed shoe and the shoe release lever in a locked position.
Figure 6C:
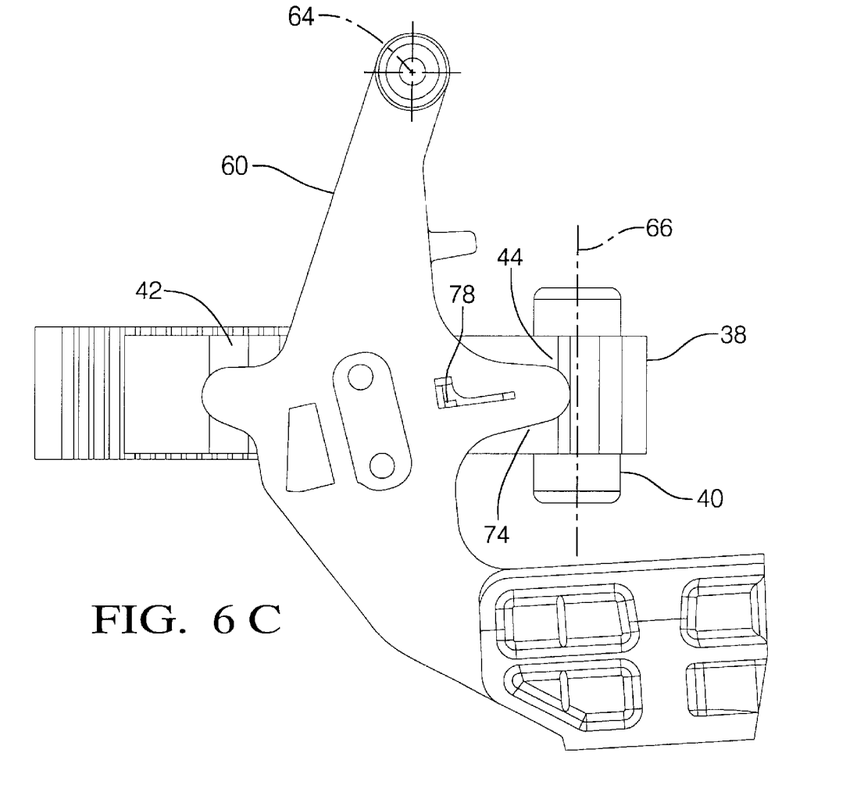
FIG. 6c is a plan view of the tilt lock pivoted shoe and shoe release lever in an unlocked position.
Figure 6D:
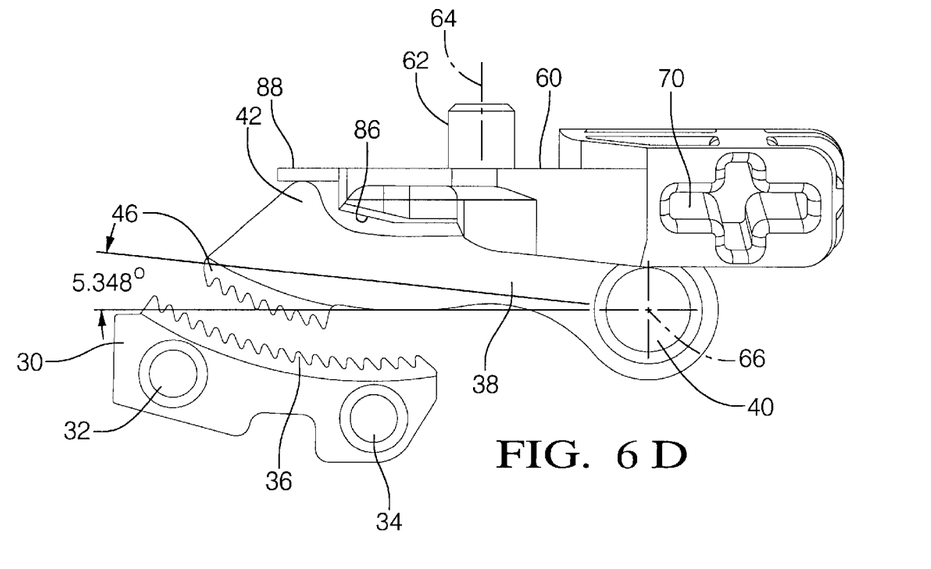
FIG. 6d is a side elevational view of the tilt lock pivoted shoe, the tilt lock fixed shoe and the shoe release lever in an unlocked position.

Clockwise movement of the shoe release lever 60, as viewed from above, moves downwardly facing cam surface 86 to the left as shown in FIGS. 6*b* and *d*. The cam surface 86, which is in contact with the cam lobe 42 on the pivoted shoe 38, urges the pivoted shoe rack 46 toward engagement with the fixed shoe 30 with teeth 36 thereby locking the tilt housing 14 relative to the support housing 15. When the shoe release lever 60 is pivoted as far forward as it will go, the shoe release lever is wedged between the cam lobe 42 and the arm 68 of the tilt housing 14 and the teeth 48 are locked in engagement with the teeth 36 of the fixed shoe 30.

Pivoting the shoe release lever 60 rearward about the axis of the integral pin 62 moves the cam surface 86 relative to the cam lobe 42 and permits the pivoted shoe arm 38 to pivot away from the fixed shoe 30. When the shoe release lever 60 reaches its rear limit of movement, the cam lobe 42 moves from the cam surface 86 to the noise reduction tab 88 and the compression spring 72 and the force pin 74 pivot the teeth 48 on the pivoted shoe 38 out of engagement with the teeth 36 on the fixed shoe 30 thereby releasing the tilt housing 14 for adjustment relative to the support housing 15. After the tilt housing 14 is pivoted to the desired position, the shoe release lever 60 is released and the spring 72 and the force pin 74 return the release lever and the pivoted shoe 38 to locking positions.

The shoe release lever 60 is a steel or powdered metal member over molded in a plastic composite such as glass filled nylon. Any material or materials can be used for the lever 60 that provide adequate strength and resistance to wear. The compression spring 72 and the force pin 74 maintain contact between the cam lobe 42 and the noise reduction tab 88 or the cam surface 86 at all times to reduce noise. In addition, the compression spring 72 and the force pin 74 also hold the pivot teeth 48 out of engagement with the fixed teeth 36 during tilt adjustment thereby reducing tooth wear. The shoe release lever 60 is biased toward a locking position at all times.

Figure 1:
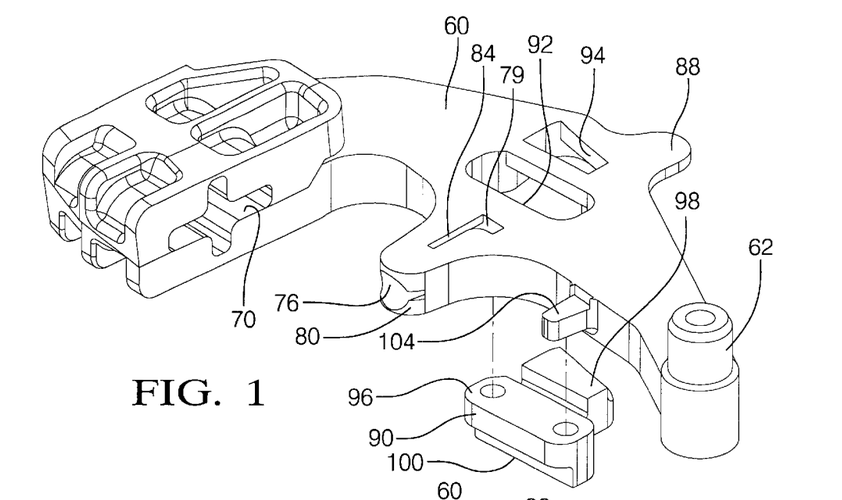
FIG. 1 is an expanded perspective view of the shoe release lever with the force pin removed.

A wedge is formed by a steel insert 90, shown as a separate piece in FIG. 1, that is molded into the recesses 92 and 94 in the shoe release lever 60. Upper surfaces 96 and 98 of the steel insert 90 contact the arm 68 of the tilt housing 14 and prevent wear of the plastic composite materials. The bottom surface 100 of the steel insert 90 forms part of cam surface 86 and contacts the cam lobe 42 on the tilt lock pivoted shoe arm 38. The bottom surface 100 also reduces wear of the plastic composite materials of the shoe release lever 60.

The handle mounted in the passage 70 is moved to the rear by a vehicle operator to adjust the position of the steering column tilt housing 14, relative to the steering column support housing 15 about the pivot pin bore axis 20. This rearward movement moves the thickest portion of the shoe release lever 60 and of the steel insert 90 from a blocking position between the cam lobe 42 and the arm 68 of the tilt housing 14. The shoe release lever 60, in its furthest rear position, frees the tilt lock pivoted shoe arm 38 to pivot about the shoe pivot pin 40. The spring 72 and the force pin 74 exert a force on the stop arm 44, pivot the shoe arm 38 about the shoe pivot pin 40, and disengage the teeth 48 from engagement with the fixed teeth 36. The tilt housing 14 is then manually pivoted about the pivot pin bore axis 20 to a selected position. The shoe release lever 60 is released. The spring 72 and the force pin 74 exert a force on the shoe release lever 60 that urges the shoe release lever 60 toward a shoe locked position shown in FIGS. 6*a* and *b*.

A plurality of teeth 48 on the tilt lock pivoted shoe arm 38 are forced into engagement with the fixed teeth 36 of the tilt lock fixed shoe 30. As shown in drawing FIGS. 5, 6*b* and 6*d*, eight teeth on the tilt lock pivoted shoe arm 38 are in engagement with nine teeth on the fixed shoe 30. There could be more or less than eight teeth 48 on the shoe arm 38 if desired. Eight teeth 48 provide a very strong connection. This strong connection allows the pitch of the teeth to be reduced and increases the number of adjustment positions of the tilt housing 14. The wedging action of the shoe release lever 60 makes it unlikely that the teeth 36 can disengage from the teeth 48 unintentionally. When the shoe release lever 60 is in the locked position, the steel insert 90 has to be compressed, the tilt housing 14 has to fail, or the support housing 15 and the fixed shoe 30 must fail for the teeth 38 to disengage from the teeth 36. With a strong holding power provided by the wedging action of the shoe release lever 60, the teeth 36 and 48 can have a tooth profile which eliminates self-locking thereby making adjustment relatively easy.

The spring 72 and the force pin 74 are capable of moving both the shoe release lever and the tilt lock pivoted shoe arm 38 as described above. However a secondary spring 102 can be received in a bore 106 in the tilt housing 14, receive a projection 104 on the shoe release lever 60 and apply additional force to move the shoe release lever to the locked position.

The disclosed embodiments are representative of presently preferred forms of the invention, but are intended to be illustrative rather than definitive thereof. The invention is defined in the claims.

We claim:

1. A fine increment tilt mechanism comprising:
    a vehicle steering column tilt assembly including a first housing and a second housing;
    a steering shaft bearing bore having an upper steering shaft axis in one of said first and second housings;
    a pivotal connection pivotally connecting said first housing to said second housing for pivotal movement about a tilt axis that is transverse to the upper steering shaft axis;
    a tilt lock shoe fixed to said second housing and having a plurality of fixed teeth on a tooth rack;
    a tilt lock pivoted shoe pivotally attached to said first housing for pivotal movement about a shoe pivot pin axis that is parallel to and spaced from the tilt axis and a plurality of pivoted shoe teeth on the tilt lock pivoted shoe that are engageable with a plurality of fixed teeth carried by said second housing; and
    a shoe release lever pivotally attached to said first housing for pivotal movement between a shoe locked position and a shoe unlocked position and having an integral wedge with a first wedge surface that slides on an arm of said first housing and a second wedge surface that engages a cam lobe on the tilt lock pivoted shoe and cams the plurality of pivoted shoe teeth into engagement with the plurality of fixed teeth when in the shoe locked position and that frees the plurality of pivoted shoe teeth to move out of engagement with the plurality of fixed teeth when in the shoe unlocked position.

2. A fine increment tilt mechanism as set forth in claim 1 wherein the tilt lock pivoted shoe is pivotally attached to said first housing by a shoe pivot pin having a pivoted shoe engaging surface that cooperates with a pivot pin bore in the tilt lock pivoted shoe and permits self-alignment between the plurality of pivoted shoe teeth and the plurality of fixed shoe teeth.

3. A fine increment tilt mechanism as set forth in claim 1 including a spring that biases the cam lobe on the tilt lock pivoted shoe toward the second wedge surface.

4. A fine increment tilt mechanism as set forth in claim 3 wherein the spring that biases the cam lobe on the tilt lock pivoted shoe toward the second wedge surface also biases the shoe release lever toward the shoe locked position.

5. A fine increment tilt mechanism as set forth in claim 3 including a second spring that biases the shoe release lever toward the shoe locked position.

6. A fine increment tilt mechanism as set forth in claim 3 including a tab on the shoe release lever that limits movement of the plurality of pivoted shoe teeth away from the plurality of fixed teeth when the shoe release lever is in the shoe unlocked position.

7. A fine increment tilt mechanism as set forth in claim 1 wherein the plurality of fixed teeth, on the tilt lock shoe fixed to said second housing, faces toward the tilt axis.

8. A fine increment tilt mechanism as set forth in claim 1 wherein said first housing is a steering column tilt housing and said second housing is a steering column support housing.

9. A fine increment tilt mechanism comprising:
    a vehicle steering column tilt assembly including a steering column tilt housing having a steering shaft bearing bore with an upper steering shaft axis, a steering column support housing having a steering column jacket bore, and a pivotal connection pivotally connecting said steering column tilt housing to said steering column support housing for pivotal movement about a tilt axis;
    a tilt lock shoe fixed to said steering column support housing and having a plurality of fixed teeth on a fixed tooth rack that is arcuate and faces toward the tilt axis;
    a tilt lock pivoted shoe pivotally attached to said steering column tilt housing by a shoe pivot pin for pivotal movement about a pivoted shoe axis that is parallel to and spaced from the tilt axis and having a plurality of pivoted shoe teeth on an arcuate tooth rack that are engageable with the plurality of fixed teeth carried by said steering column support housing, a cam lobe on a free end of the tilt lock pivoted shoe, and a stop arm on a pivoted end of the tilt lock pivoted shoe; and
    a shoe release lever pivotally attached to said steering column tilt housing for pivotal movement between a shoe locked position and a shoe unlocked position and having an integral wedge with a first wedge surface that slides on an arm of said steering column tilt housing and a second wedge surface that engages a cam lobe on the tilt lock pivoted shoe and cams the plurality of pivoted shoe teeth into engagement with the plurality of fixed teeth when in the shoe locked position and that frees the plurality of pivoted shoe teeth to move out of engagement with the plurality of fixed teeth when in the shoe unlocked position.

10. A fine increment tilt mechanism as set forth in claim 9 wherein the tilt lock pivoted shoe is pivotally attached to said steering column tilt housing by a shoe pivot pin with a pair of noncylindrical surfaces that cooperate with a pivot pin bore through the tilt lock pivoted shoe to permit self-alignment between the plurality of pivoted shoe teeth and the plurality of fixed shoe teeth.

11. A fine increment tilt mechanism as set forth in claim 9 including a second compression spring mounted in a bore in said steering column tilt housing and in engagement with the shoe release lever and a that urges the shoe release lever toward the shoe locked position.

12. A fine increment tilt mechanism as set forth in claim 9 including a first compression spring mounted in a lever bore in the shoe release lever that exerts a force on a force pin that contacts the stop arm on the tilt lock pivoted shoe, urges the plurality pivoted shoe teeth out of engagement with the plurality of fixed teeth, and urges the shoe release lever toward the shoe locked position.

13. A fine increment tilt mechanism as set forth in claim 9 wherein the shoe release lever includes an integral tab that is contacted by the cam lobe on the tilt lock pivoted shoe when the shoe release lever is in the shoe unlocked position.

14. A method of adjusting the tilt position of a vehicle steering column tilt assembly comprising:

pivoting a shoe release lever toward a shoe unlocked position thereby removing a wedge on the shoe release lever from a position between an arm on a steering column tilt housing and a cam lobe on a tilt lock pivoted shoe and freeing the tilt lock pivoted shoe to pivot to an unlocked position;

pivoting the steering column tilt housing about a tilt axis to a selected position relative to a steering column support housing;

moving the shoe release lever toward a shoe locked position by moving the wedge on the shoe release lever between the lobe on the tilt lock pivoted shoe and the arm on the steering column tilt housing and locking a plurality of pivoted shoe teeth on the tilt lock pivoted shoe in engagement with a plurality of fixed teeth carried by the steering column support housing.

* * * * *